US007099142B2

(12) United States Patent
Otsuki et al.

(10) Patent No.: US 7,099,142 B2
(45) **Date of Patent: *Aug. 29, 2006**

(54) ADDITIVE FOR NON-AQUEOUS LIQUID ELECTROLYTE SECONDARY CELL, NON-AQUEOUS LIQUID ELECTROLYTE SECONDARY CELL, ADDITIVE FOR NON-AQUEOUS LIQUID ELECTROLYTE ELECTRIC DOUBLE LAYER CAPACITOR AND NON-AQUEOUS LIQUID ELECTROLYTE ELECTRIC DOUBLE LAYER CAPACITOR

(75) Inventors: Masashi Otsuki, Musashimurayama (JP); Shigeki Endo, Tokorozawa (JP); Takao Ogino, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 456 days.

This patent is subject to a terminal disclaimer.

(21) Appl. No.: 10/363,542

(22) PCT Filed: Sep. 5, 2001

(86) PCT No.: PCT/JP01/07692

§ 371 (c)(1),
(2), (4) Date: Mar. 5, 2003

(87) PCT Pub. No.: WO02/21631

PCT Pub. Date: Mar. 14, 2002

(65) Prior Publication Data

US 2003/0175598 A1 Sep. 18, 2003

(30) Foreign Application Priority Data

Sep. 7, 2000 (JP) ............................. 2000-272082
Sep. 7, 2000 (JP) ............................. 2000-272083

(51) Int. Cl.
*H01G 9/00* (2006.01)

(52) U.S. Cl. ....................... 361/502; 361/503; 361/504

(58) Field of Classification Search ................ 361/502, 361/503, 504; 429/328
See application file for complete search history.

(56) References Cited

U.S. PATENT DOCUMENTS

| | | | | |
|---|---|---|---|---|
| 4,713,731 | A | 12/1987 | Boss et al. | |
| 5,591,545 | A | 1/1997 | Miyashita et al. | |
| 5,725,968 | A | 3/1998 | Sato et al. | |
| 5,780,185 | A | 7/1998 | Oki et al. | |
| 5,830,600 | A * | 11/1998 | Narang et al. | 429/203 |
| 6,152,970 | A | 11/2000 | Wel et al. | |
| 6,452,782 | B1 * | 9/2002 | Otsuki et al. | 361/504 |

FOREIGN PATENT DOCUMENTS

| | | |
|---|---|---|
| CN | 1471743 A | 1/2004 |
| JP | A 4-301370 | 10/1992 |
| JP | A 5-74467 | 3/1993 |
| JP | 06-013108 | 1/1994 |
| JP | 11-144757 | 5/1999 |
| JP | 11-191431 | 7/1999 |
| JP | 2000-021442 | 1/2000 |
| JP | 2000-030740 | 1/2000 |
| JP | A 2001-102088 | 4/2001 |
| JP | A 2001-217001 | 8/2001 |
| JP | A 2001-217155 | 8/2001 |
| JP | A 2001-217156 | 8/2001 |
| WO | WO 01/09973 A1 | 2/2001 |
| WO | WO 01/39314 A1 | 5/2001 |
| WO | WO 02/21629 A1 | 3/2002 |

* cited by examiner

*Primary Examiner*—Laura Weiner
(74) *Attorney, Agent, or Firm*—Oliff & Berridge, PLC

(57) ABSTRACT

The present invention provides additives for a non-aqueous electrolytic solution secondary cell and a non-aqueous electrolytic solution electric double layer capacitor comprising a phosphazene derivative represented by formula (1):

$$(PNF_2)_n \qquad \text{formula (1)}$$

wherein n represents 3 to 14, and provides the non-aqueous electrolytic solution secondary cell and the non-aqueous electrolytic solution electric double layer capacitor each containing a non-aqueous electrolytic solution which has the additive for the non-aqueous electrolytic solution secondary cell or the additive for the non-aqueous electrolytic solution electric double layer capacitor and a supporting salt, an anode, and a cathode.

5 Claims, No Drawings

ADDITIVE FOR NON-AQUEOUS LIQUID ELECTROLYTE SECONDARY CELL, NON-AQUEOUS LIQUID ELECTROLYTE SECONDARY CELL, ADDITIVE FOR NON-AQUEOUS LIQUID ELECTROLYTE ELECTRIC DOUBLE LAYER CAPACITOR AND NON-AQUEOUS LIQUID ELECTROLYTE ELECTRIC DOUBLE LAYER CAPACITOR

TECHNICAL FIELD

The present invention relates to a non-aqueous electrolytic solution secondary cell and a non-aqueous electrolytic solution electric double layer capacitor, which have excellent deterioration resistance, low internal resistance, excellent conductivity because the viscosity of the non-aqueous electrolytic solution is low, and excellent low-temperature characteristics, and to additives used for the non-aqueous electrolytic solution secondary cell and the non-aqueous electrolytic solution electric double layer capacitor.

BACKGROUND ART

Conventionally, nickel-cadmium cells have been the main cells used as secondary cells for memory-backup or sources for driving AV (Audio Visual) and information devices, particularly personal computers, VTRs (video tape recorders) and the like. Lately, non-aqueous electrolytic solution secondary cells have been drawing a lot of attention as a replacement for the nickel-cadmium cells because non-aqueous electrolytic solution secondary cells have advantages of high voltage, high energy concentration, and displaying excellent self-dischargeability. Various developments of the non-aqueous electrolytic solution secondary cells have been performed and a portion of these developments has been commercialized. For example, more than half of notebook type personal computers, cellular phones and the like are driven by the non-aqueous electrolytic solution secondary cells.

Carbon is often used as a cathode material in the non-aqueous electrolytic solution secondary cells, and various organic solvents are used as electrolytic solutions in order to mitigate the risk when lithium is produced on the surface of cathode, and to increase outputs of driven voltages. Further, particularly in non-aqueous electrolytic solution secondary cells for use in cameras, alkali metals (especially, lithium metals or lithium alloys) are used as the cathode materials, and aprotic organic solvents such as ester organic solvents are ordinarily used as the electrolytic solutions.

However, although these non-aqueous electrolytic solution secondary cells exhibit high performance, they are prone to deterioration. Accordingly, a problem occurs in that these non-aqueous electrolytic solution secondary cells cannot maintain high performance for a long period of time. For this reason, there has been a high demand for development of a non-aqueous electrolytic solution secondary cells in which deterioration is prevented, whereby cell properties such as high charging/discharging capacity and high conductivity, and low internal resistance can be maintained for a long period of time.

Further, development has been required of non-aqueous electrolytic solution secondary cells which have excellent low-temperature characteristics because cell properties must be maintained for a long period of time even under low-temperature conditions such as in the regions or seasons in which the temperature is low.

On the other hand, a non-aqueous electrolytic solution electric double layer capacitor is a condenser making use of electric double layers formed between polarizable electrodes and electrolytes. The non-aqueous electrolytic solution electric double layer capacitor is a product that was developed and commercialized in the 1970s, was in its infancy in the 1980s, and has grown and evolved since the 1990s.

This type of capacitor is different from a cell in which a cycle of an oxidation-reduction reaction accompanied by substance movement is a charging/discharging cycle in that a cycle for electrically absorbing, on a surface of electrodes, ions from electrolytic solutions is a charging/discharging cycle.

For this reason, the electric double layer capacitor is more excellent in instant charging/discharging properties than those of a cell. Repeatedly charging/discharging the capacitor does not deteriorate the instant charging/discharging properties.

Further, in the electric double layer capacitor, since excessive charging/discharging voltage does not occur during charging/discharging, simple and less expensive electric circuits will suffice for the capacitor. Moreover, it is easy to know a remaining capacitance in the capacitor, and the capacitor has endurance under conditions of a wide range of temperature of from −30° C. to 90° C. In addition, the capacitor is pollution-free, and the like. As described above, the capacitor is superior to the cell. Consequently, the electric double layer capacitor is in the spotlight as a new energy storage product that is kind to the global environment.

The electric double layer capacitor is an energy storage device comprising positive and negative polarizable electrodes and electrolytes. At the interface at which the polarizable electrodes and the electrolytes come into contact with each other, positive and negative electric charges are arranged so as to face one another and be separated from one another by an extremely short distance to thereby form an electric double layer. The electrolytes play a role as ion sources for forming the electric double layer. Thus, in the same manner as for the polarizable electrodes, the electrolytes are an essential substance for controlling fundamental properties of the energy storage device.

As the electrolytes, aqueous-electrolytic solutions, non-aqueous electrolytic solutions, or solid electrolytes are conventionally known. However, from a viewpoint of improvement of energy density of the electric double layer capacitor, the non-aqueous electrolytic solution in which a high operating voltage is enabled has particularly been in the spotlight, and practical use thereof is progressing.

A non-aqueous electrolytic solution is now put to practical use in which solutes such as $(C_2H_5)_4P.BF_4$ and $(C_2H_5)_4N.BF_4$ were dissolved in highly dielectric solvents such as carbonic acid carbonates (e.g., ethylene carbonate and propylene carbonate), γ-butyrolactone, and the like.

However, although these non-aqueous electrolytic solution electric double layer capacitors exhibit high performance, they are prone to deterioration. Accordingly, a problem has been caused in that a non-aqueous electrolytic solution electric double layer capacitor cannot maintain high performance for a long period of time. For this reason, there has been a high demand for development of a non-aqueous electrolytic solution electric double layer capacitor in which occurrence of deterioration thereon is prevented, whereby capacitor properties can be maintained for a long period of time.

Further, there has been a demand for development of a non-aqueous electrolytic solution electric double layer capacitors which are also excellent in low-temperature characteristics because electric characteristics must be maintained for a long period of time even under low-temperature conditions such as in regions or seasons in which the temperature is low.

DISCLOSURE OF INVENTION

It is an object of the present invention to solve the conventional problems described above, meet various needs, and accomplish the following objects. Namely, an object of the present invention is to provide an additive for a non-aqueous electrolytic solution secondary cell. The additive for the non-aqueous electrolytic solution secondary cell is added to the non-aqueous electrolytic solution secondary cell. While maintaining cell properties required for cells, the additive for the non-aqueous electrolytic solution secondary cell is able to make the non-aqueous electrolytic solution secondary cell which has excellent deterioration resistance, in which electric conductivity is high because interface resistance at a non-aqueous electrolytic solution is low to thereby reduce internal resistance, and which has excellent low-temperature characteristics. Further, another object of the present invention is to provide a non-aqueous electrolytic solution secondary cell which contains therein the additive for the non-aqueous electrolytic solution secondary cell, which has excellent deterioration resistance, in which electric conductivity is high because interface resistance at a non-aqueous electrolytic solution is low and internal resistance is thereby low, and which has excellent low-temperature characteristics.

Still another object of the present invention is to provide an additive for a non-aqueous electrolytic solution electric double layer capacitor. The additive for the non-aqueous electrolytic solution electric double layer capacitor is added to the non-aqueous electrolytic solution electric double layer capacitor. While maintaining sufficient electric characteristics, the additive for the non-aqueous electrolytic solution electric double layer capacitor is able to make the non-aqueous electrolytic solution electric double layer capacitor which has excellent deterioration resistance, in which electric conductivity is high because interface resistance at a non-aqueous electrolytic solution is low, and internal resistance is low, and which has excellent low-temperature characteristics. Further, the object of the present invention is to provide a non-aqueous electrolytic solution electric double layer capacitor. The non-aqueous electrolytic solution electric double layer capacitor contains therein the additive for the non-aqueous electrolytic solution electric double layer capacitor, and while maintaining sufficient electric characteristics such as electrical conductivity, the non-aqueous electrolytic solution electric double layer capacitor has excellent deterioration resistance, high electric conductivity because interface resistance at a non-aqueous electrolytic solution is low and internal resistance is thereby low, and excellent low-temperature characteristics.

The present invention provides an additive for a non-aqueous electrolytic solution secondary cell, which contains therein a phosphazene derivative represented by formula (1):

$$(PNF_2)_n \qquad \text{formula (1)}$$

In formula (1), n represents 3 to 14.

Further, the present invention provides a non-aqueous electrolytic solution secondary cell comprising a non-aqueous electrolytic solution containing therein the additive for the non-aqueous secondary cell and supporting salt, an anode, and a cathode.

Moreover, the present invention provides an additive for a non-aqueous electrolytic solution electric double layer capacitor, which contains therein a phosphazene derivative represented by formula (1):

$$(PNF_2)_n \qquad \text{formula (1)}$$

In formula (1), n is 3 to 14.

Further, the present invention provides a non-aqueous electrolytic solution electric double layer capacitor comprising a non-aqueous electrolytic solution containing therein the additive for the non-aqueous electrolytic solution electric double layer capacitor and a supporting salt, an anode, and a cathode.

BEST MODE FOR CARRYING OUT THE INVENTION

A more detailed description of the present invention will be made hereinafter.

1. Additives for a Non-Aqueous Electrolytic Solution Secondary Cell and a Non-Aqueous Electrolytic Solution Electric Double Layer Capacitor Each of the additives for a non-aqueous electrolytic solution secondary cell or a non-aqueous electrolytic solution electric double layer capacitor of the present invention contains therein a phosphazene derivative, and other components if necessary:

--Phosphazene Derivative--

A phosphazene derivative is contained in the additive for the non-aqueous electrolytic solution secondary cell for the following reasons:

In ester-based electrolytic solutions as electrolytic solutions of a conventional non-aqueous electrolytic solution secondary cell, it is considered that corrosion of the secondary cell occurs and proceeds due to a $PF_5$ gas generated when, for example, a lithium ion source such as an $LiPF_6$ salt as a supporting salt decomposes into LiF and $PF_5$ as time goes by, or due to a hydrogen fluoride gas that is generated when the generated $PF_5$ gas further reacts with water or the like. Thus, a phenomenon in which not only conductivity of the non-aqueous electrolytic solution deteriorates, but also electrode materials deteriorate due to the generation of the hydrogen fluoride gas.

On the other hand, the phosphazene derivative contributes to suppress decomposition of lithium ion sources such as $LiPF_6$ salts, and stabilize the same. Accordingly, the phosphazene derivative can be added to a conventional non-aqueous electrolytic solution to suppress decomposition reaction of the non-aqueous electrolytic solution, whereby corrosion and deterioration of the secondary cell can suitably be suppressed.

Further, the phosphazene derivative is a liquid whose viscosity is low at ordinary temperature (25° C.). Therefore, the addition of the additive for the non-aqueous electrolytic solution secondary cell of the present invention containing therein the phosphazene derivative to the non-aqueous electrolytic solution secondary cell realizes a non-aqueous electrolytic solution having a low viscosity, whereby a non-aqueous electrolytic solution secondary cell having low internal resistance and having high conductivity can be provided.

Moreover, the addition of the additive for a non-aqueous electrolytic solution secondary cell of the present invention containing therein the phosphazene derivative to the non-aqueous electrolytic solution can impart excellent low-temperature characteristics to the non-aqueous electrolytic solution. Therefore, the present invention can provide non-aqueous electrolytic solution secondary cells that can exhibit excellent discharging characteristics for a long period of time even under low-temperature conditions such as in regions or seasons in which the temperature is low.

Reasons why the phosphazene derivatives are contained in the additive for the non-aqueous electrolytic solution electric double layer capacitor can be assumed as described below.

In a conventional non-aqueous electrolytic solution electric double layer capacitor, it is considered that compounds generated due to decomposition or reaction of the electrolytic solution or the supporting salt in the non-aqueous electrolytic solution cause electrodes and peripheral materials of the electrodes to corrode. Or it is also considered that, since the amount of the supporting salt itself decreases due to the decomposition or the reaction, electric characteristics are damaged, resulting in deterioration of the performance of the capacitor.

On the other hand, the phosphazene derivative contributes to suppress decomposition or reaction of electrolytic solutions or supporting salts to stabilize the same (the phosphazene derivative especially works well on $PF_6$ salts). Accordingly, the phosphazene derivative is added to the conventional non-aqueous electrolytic solution thus making it possible to prevent deterioration of the electric double layer capacitor while maintaining electric characteristics of the capacitor.

Further, as described above, the phosphazene derivative is a liquid whose viscosity is low at ordinary temperature (25° C.). Therefore, the addition of the additive for the non-aqueous electrolytic solution double layer capacitor of the present invention, which contains therein the phosphazene derivative, to the non-aqueous electrolytic solution double layer capacitor realizes the non-aqueous electrolytic solution having a low viscosity, thus making it possible to provide a non-aqueous electrolytic solution double layer capacitor having low internal resistance and high conductivity.

Moreover, the addition of the additive for the non-aqueous electrolytic solution double layer capacitor of the present invention, which contains therein the phosphazene derivative to the non-aqueous electrolytic solution double layer capacitor can provide the non-aqueous electrolytic solution with excellent low-temperature characteristics. Therefore, it becomes possible to provide a non-aqueous electrolytic solution double layer capacitor which exhibits excellent electric characteristics for a long period of time when used under low-temperature conditions such as in regions or seasons in which the temperature is low.

--Molecular Structure--

A phosphazene derivative is represented by formula (1):

$$(PNF_2)_n \quad \text{formula (1)}$$

In formula (1), n is of 3 to 14.

In formula (1), from viewpoints that it is possible for the phosphazene derivative represented by formula (1) to provide the non-aqueous electrolytic solution with excellent low-temperature characteristics, and to lower the viscosity of the non-aqueous electrolytic solution, n is preferably 3 to 4, and more preferably 3.

Ordinarily, in a compound containing a halogen element (fluorine) such as the phosphazene derivative described above, there is often caused a problem about the formation of halogen radicals. However, with the phosphazene derivative, such a problem is not caused because a phosphorus element in its molecular structure captures halogen radicals and forms stable halogenated phosphorus.

In formula (1), n values are appropriately selected, whereby it becomes possible to synthesize a non-aqueous electrolytic solution having more preferable viscosity, boiling points, solubility that is suitable for mixture, and low-temperature characteristics. These phosphazene derivatives can be used alone or in combination.

--Flash Point--

Flash point of the phosphazene derivative is not particularly limited. However, from a viewpoint of suppression of combustion, it is preferably 100° C. or more, and more preferably 150° C. or more.

If the flash point of the phosphazene derivative is 100° C. or more, combustion or the like can be suppressed. Further, even if combustion or the like occurs inside cells or capacitors, it becomes possible to prevent a danger of causing the phosphazene derivative to be ignited and combusted to spread over the surface of the electrolytic solution.

The "flash point" specifically refers to a temperature at which flame spreads over the surface of a substance and covers 75% thereof. The flash point can be a criterion to see a tendency at which a mixture that is combustible with air is formed. In the present invention, a value measured by a "Mini-flash" method described below is used. Namely, an apparatus (i.e., an automatic flammability measuring device, MINIFLASH manufactured by GRABNER INSTRUMENTS Inc.) comprising a small measuring chamber (4 ml), a heating cup, a flame, an ignition portion and an automatic flame sensing system is prepared in a sealed cup method. A sample to be measured (1 ml) is put into the heating cup. This heating cup is covered with a cover. The heating cup is heated from the upper portion of the cover. Hereinafter, the temperature of the sample is arisen at a constant interval, a mixture of vapor and air in the cup is ignited at a constant interval of temperature, and combustion is detected. The temperature when combustion is detected is regarded as a flash point.

As each of amounts in which the additives for a non-aqueous electrolytic solution secondary cell and a non-aqueous electrolytic solution electric double layer capacitor of the present invention are added thereto, use of an amount which is equal to a preferable range of values of the content of the phosphazene derivative in a non-aqueous electrolytic solution secondary cell/a non-aqueous electrolytic solution electric double layer capacitor which will be described below is preferable. The amount of the additive of the present invention is controlled to a value within the aforementioned range to suitably provide effects of the invention such as deterioration resistance, low viscosity and low-temperature characteristics of the non-aqueous electrolytic solution.

In accordance with the above-described additives for a non-aqueous electrolytic solution secondary cell and a non-aqueous electrolytic solution electric double layer capacitor of the present invention, the addition of the respective additives to the non-aqueous electrolytic solution secondary cell and the non-aqueous electrolytic solution electric double layer capacitor can provide additives for a non-aqueous electrolytic solution secondary cell and a non-aqueous electrolytic solution electric double layer capacitor capable of making a non-aqueous electrolytic solution secondary cell and a non-aqueous electrolytic solution electric double layer capacitor, while maintaining cell properties required for cells or sufficient electric characteristics required for capacitors, which exhibit excellent deterioration resistance, low interface resistance at a non-aqueous electrolytic solution, low internal resistance, and accordingly exhibit high conductivity, and which exhibit excellent low-temperature characteristics.

2. A Non-Aqueous Electrolytic Solution Secondary Cell

The non-aqueous electrolytic solution secondary cell of the present invention comprises an anode, a cathode, and a non-aqueous electrolytic solution, and if necessary, other member.

--Anode--

Materials for anodes are not particularly limited, and can be appropriately selected from any known anode materials, and used. Preferable examples of anode materials include: metal oxides such as $V_2O_5$, $V_6O_{13}$, $MnO_2$, $MoO_3$, $LiCoO_2$, $LiNiO_2$, and $LiMn_2O_4$; metal sulfides such as $TiS_2$ and $MoS_2$; and conductive polymers such as polyaniline. Among these, $LiCoO_2$, $LiNiO_2$ and $LiMn_2O_4$ are preferable because they are safe, have high capacity, and are excellent in wettability with respect to electrolytic solutions. The materials can be used alone or in combination.

Configuration of the anodes is not particularly limited, and can be preferably selected from known configurations as electrodes, such as sheet, solid-cylindrical, plate and spiral-shaped configurations.

--Cathode--

Materials for a cathode are not particularly limited as long as they can absorb and discharge lithium or lithium ions. The cathode can be selected appropriately from known cathode materials, and used. Preferable examples of cathode materials include those containing lithium therein such as lithium metal itself; alloys of lithium and aluminum, indium, lead or zinc; and a carbon material such as lithium-doped graphite. Among these materials, a carbon material such as graphite is preferable from the viewpoint of high safety. These materials can be used alone or in combination.

Configuration of a cathode is not particularly limited, and can appropriately be selected from known configurations in the same manner as those of the above-described anode.

--Non-Aqueous Electrolytic Solution--

A non-aqueous electrolytic solution contains the additive for the non-aqueous electrolytic solution secondary cell of the present invention and a supporting salt and, and, if necessary, other components.

--Supporting Salt--

As a supporting salt, ion sources of lithium ions are preferable. ion sources of the lithium ions such as $LiClO_4$, $LiBF_4$, $LiPF_6$, $LiCF_3SO_3$, $LiAsF_6$, $LiC_4F_9SO_3$, $Li(CF_3SO_2)_2$ N, and $Li(C_2F_5SO_2)_2N$ can preferably be used. These can be used alone or in combination.

An amount in which the supporting salt is contained in the non-aqueous electrolytic solution (solvent component) (1 kg) is preferably 0.2 to 1 mol, and more preferably 0.5 to 1 mol.

If the amount in which the supporting salt is contained in the non-aqueous electrolytic solution is less than 0.2 mol, sufficient conductivity of the non-aqueous electrolytic solution cannot be secured. Therefore, charging/discharging characteristics of cells may be damaged. Meanwhile, if the amount in which the supporting salt is contained in the non-aqueous electrolytic solution is more than 1 mol, viscosity of the non-aqueous electrolytic solutions increases, sufficient mobility of the lithium ion or the like cannot be secured, and sufficient conductivity of the non-aqueous electrolytic solutions cannot be secured as in the above-description. Therefore, charging/discharging characteristics of the cells may be damaged.

--Additive for a Non-Aqueous Electrolytic Solution Secondary Cell--

The additive for non-aqueous electrolytic solution secondary cells is that which is the same as in the description about the additive disclosed in the present invention, and contains therein the phosphazene derivative represented by formula (1).

--Viscosity--

Viscosity of a non-aqueous electrolytic solution at 25° C. is preferably 10 mPa.s (10 cP) or less, more preferably 5 mPa.s (5 cP) or less, and most preferably 4.0 mPa.s (4.0 cP) or less.

If the viscosity is 10 mPa.s (10 cP) or less, a non-aqueous electrolytic solution secondary cell having excellent cell properties such as low internal resistance, high conductivity and the like can be obtained.

Viscosity is measured for 120 minutes at each of rotational speeds of 1 rpm, 2 rpm, 3 rpm, 5 rpm, 7 rpm, 10 rpm, 20 rpm and 50 rpm by a viscometer (product name: R-type viscometer Model RE500-SL, manufactured by Toki Sangyo K.K.) and determined on the basis of the rotational speed as an analysis condition at which the value indicated by the viscometer reached 50 to 60%.

--Conductivity--

The viscosity of the non-aqueous electrolytic solution is adjusted to the aforementioned preferable range of values, thereby facilitating the non-aqueous electrolytic solution to have preferable conductivity. In a case of a solution in which lithium salt is dissolved at the concentration of 0.75 mol/l, the conductivity is preferably 2.0 mS/cm or more, and more preferably 5.0 mS/cm or more.

If the conductivity is 2.0 mS/cm or more, sufficient conductivity of the non-aqueous electrolytic solution can be secured, thus making it possible to suppress internal resistance of the non-aqueous secondary cell, and also control ascent/descent of potentials during charging/discharging thereof.

The conductivity is a value obtained through a measuring method described below. Namely, the conductivity is measured under predetermined conditions (temperature: 25° C., pressure: normal pressure, and moisture percentage: 10 ppm or less) by using a conductivity meter (CDM210 type manufactured by Radio Meter Trading Co., Ltd.), while applying a constant current of 5 mA to the non-aqueous electrolytic solution secondary cell.

As for the conductivity, theoretically, at first, a conductance (Gm) of a non-aqueous electrolytic solution is calculated. From this, influence by a cable resistance (R) is removed to determine a conductance (G) of the electrolytic solution itself. Accordingly, a conductance K=G·K (S/cm) can be determined from the obtained value (G) and the cell constant (K) already known.

--Content--

Owing to the effects obtained by containing the phosphazene derivative in the non-aqueous electrolytic solution, a total amount in which the phosphazene derivative is contained in the non-aqueous electrolytic solution comprises: three types of contents comprising: a first content capable of more preferably providing the non-aqueous electrolytic solution with “low-temperature characteristics”; a second content capable of more preferably lowering the viscosity of the non-aqueous electrolytic solution; and a third content capable of more preferably providing the non-aqueous electrolytic solution with "deterioration resistance".

From the viewpoint of the "low-temperature characteristics", the first content of the phosphazene derivative in the non-aqueous electrolytic solution is preferably 1 vol % or more, more preferably 3 vol % or more, and most preferably 5 vol % or more.

When the first content is less than 1 vol %, it becomes impossible to lower the freezing point of a non-aqueous electrolytic solution sufficiently, thus making it impossible to obtain enough low-temperature characteristics.

Further, the "low-temperature characteristics" are measured and evaluated due to the evaluation of the low-temperature characteristics described below. Namely, cells are charged at 20° C. under the conditions of a maximum voltage of 4.5V, a minimum voltage of 3.0V, and a charging current of 50 mA. Thereafter, charging/discharging in which a discharging current of 100 mA is discharged is repeated to 50 cycles at low temperatures (such as 0° C., −10° C., and −20° C.). The discharging capacity at low temperature at this time is compared with that measured at 20° C. to calculate a discharging capacity remaining ratio by the following equation (2). Similarly, the discharging capacity remaining ratio is measured and calculated with respect to total three cells to determine a mean value. Accordingly, low-temperature characteristics are evaluated.

discharging capacity remaining ratio=discharging capacity at low temperature/discharging capacity (20° C.)×100(%) Equation (2)

The second content of the phosphazene derivative in the non-aqueous electrolytic solution is preferably 3 to 80 vol % in order to lower the viscosity of the non-aqueous electrolytic solution, and more preferably 5 to 80 vol % in order to satisfy both the low-temperature characteristics and the decrease of viscosity of the non-aqueous electrolytic solution at high level.

When the second content is less than 3 vol %, the viscosity of the non-aqueous electrolytic solution may not be sufficiently lowered. Besides, due to the descent of the freezing point, effects of the low-temperature characteristics improved by the addition of the phosphazene derivative to the non-aqueous electrolytic solution may not be developed. On the other hand, if the content exceeds 80 vol %, since the dipole moment is small, and solubility of the supporting salt deteriorates, excellent cell properties cannot be obtained in some cases.

From the viewpoint of the "deterioration resistance", the third content of the phosphazene derivative in the non-aqueous electrolytic solution is preferably 2 vol % or more, and more preferably 3 to 75 vol %. Further, from the viewpoint that the third content suffices both deterioration resistance and low-temperature characteristics at high level, 5 to 75 vol % is more preferable.

If the content is within the aforementioned range of values, deterioration can suitably be suppressed.

"Deterioration" refers to decomposition of a supporting salt (for example, lithium salt), and effects due to prevention of the deterioration are evaluated by an evaluation method of stability described below.

(1) First, the non-aqueous electrolytic solution containing a supporting salt is prepared. Thereafter, moisture content of this is measured. Then, concentration of a hydrogen fluoride in the non-aqueous electrolytic solution is measured by a high performance liquid chromatography (ion chromatography). Further, hues of the non-aqueous electrolytic solution are visually observed. Thereafter, charging/discharging capacity is calculated by a charging/discharging test.

(2) The non-aqueous electrolytic solution is left in a gloved box for 2 months. Thereafter, moisture content and concentration of a hydrogen fluoride are measured again, hues are visually observed, and charging/discharging capacity is calculated. In accordance with variations of the obtained values, stability of the non-aqueous electrolytic solution is evaluated.

--Other Component--

As the other component, an aprotic organic solvent and the like are particularly preferable in respect of safety.

If an aprotic organic solvent is contained in the non-aqueous electrolytic solution, since the aprotic organic solvent never react with the above-described cathode materials, high safety can be ensured, and the lowering of viscosity of the non-aqueous electrolytic solution is enabled, thereby facilitating the non-aqueous electrolytic solution to easily attain optimum ionic conductivity as the non-aqueous electrolytic solution secondary cell.

Examples of the aprotic organic solvents are not particularly limited, but include: ether compounds and ester compounds from the viewpoint of the lowering of viscosity of the non-aqueous electrolytic solution, and specific examples thereof include: 1,2-dimethoxyethane, tetrahydrofuran, dimethyl carbonate, diethyl carbonate, diphenyl carbonate, ethylene carbonate, propylene carbonate, γ-butyrolactone, γ-valerolactone, and methyl ethyl carbonate.

Among these, cyclic ester compounds such as ethylene carbonate, propylene carbonate, and γ-butyrolactone, chain ester compounds such as 1,2-dimethoxyethane, dimethyl carbonate, ethyl methyl carbonate, and diethyl carbonate are preferable. The cyclic ester compounds are preferable in that they have high relative dielectric constants and can dissolve easily lithium salts or the like, and the chain ester compounds are preferable in that they have low viscosity, and are able to lower the viscosity of the non-aqueous electrolytic solution. These can be used alone. However, use of two or more of these in combination is preferable.

--Viscosity of an Aprotic Organic Solvent--

Viscosity of the aprotic organic solvent at 25° C. is preferably 10 mPa.s (10 cP) or less, and more preferably 5 mPa.s (5 cP) or less in order to easily lower the viscosity of the non-aqueous electrolytic solution.

--Other Member--

As other member, a separator that is interposed between a cathode and an anode in order to prevent a short circuit of electric currents by both the cathode and anode contacting to each other, and known members generally used in cells are preferably used.

Examples of materials for a separator include materials which are able to reliably prevent both electrodes from contacting each other and to include electrolytic solutions therein or flow the same therethrough. Specific examples of the materials include: synthetic resin non-woven fabrics such as polytetrafluoroethylene, polypropylene, and polyethylene, thin films, and the like. Among these, use of a micro-porous polypropylene or polyethylene film having a thickness of from 20 to 50 μm is particularly preferable.

<Internal Resistance of a Non-Aqueous Electrolytic Solution Secondary Cell>

An internal resistance (Ω) of a non-aqueous electrolytic solution secondary cell can easily have a preferable value due to the control of the viscosity of the non-aqueous electrolytic solution to the aforementioned preferable range of values. The internal resistance (Ω) is preferably 0.1 to 0.3 (Ω), and more preferably 0.1 to 0.25 (Ω).

The internal resistance can be obtained by a known method such as the method described below in which internal resistance is measured. Namely, when the non-aqueous electrolytic solution secondary cell is made and charging/discharging curves are measured, the internal resistance can be obtained by a deflection width of potentials in accordance with charging rest or discharging rest.

<Capacity of a Non-Aqueous Electrolytic Solution Secondary Cell>

When $LiCoO_2$ is an anode, the capacity (charging/discharging capacity) (mAh/g) of the non-aqueous electrolytic solution secondary cell is preferably 140 to 145 (mAh/g), and more preferably 143 to 145 (mAh/g).

A known method is used for measuring the charging/discharging capacity, such as the one in which a charging/discharging test is carried out by using a semi-open type cell or a closed type coin cell (See Masayuki Yoshio, "Lithium ion secondary cell" published by Nikkan Kogyo Shinbunsha), whereby a capacity is determined by charging current (mA), time (t) and weight of an electrode material (g).

<Shape of a Non-Aqueous Electrolytic Solution Secondary Cell>

The shape of a non-aqueous electrolytic solution secondary cell is not particularly limited and is suitably formed into various known configurations such as a coin-type cell, a button-type cell, a paper-type cell, a square-type cell and a cylindrical cell having a spiral structure.

In the case of the spiral structure, a sheet type anode is prepared to sandwich a collector, and a (sheet type) cathode is superimposed on this, and rolled up, whereby a non-aqueous electrolytic solution secondary cell can be prepared.

<Performance of a Non-Aqueous Electrolytic Solution Secondary Cell>

The non-aqueous electrolytic solution secondary cell of the present invention is excellent in deterioration resistance, has the non-aqueous electrolytic solution with low interface resistance, and has low internal resistance to thereby increase conductivity, and is also excellent in low-temperature characteristics.

3. Non-Aqueous Electrolytic Solution Electric Double Layer Capacitor

The non-aqueous electrolytic solution electric double layer capacitor of the present invention comprises an anode, a cathode, a non-aqueous electrolytic solution, and, if necessary, other member.

--Anode--

Materials for an anode of non-aqueous electrolytic solution electric double layer capacitors are not particularly limited. However, use of carbon based-polarizable electrodes is generally preferable. As the polarizable electrodes, it is preferable to use electrodes in which specific surface and/or bulk concentration thereof are large, which are electro-chemically inactive, and which have a low resistance.

The polarizable electrodes are not particularly limited. However, the polarizable electrodes generally contain an activated carbon, and if necessary, other component such as a conductive agent or a binder.

--Activated Carbon--

Raw materials for an activated carbon are not particularly limited, and typical examples thereof include phenol resins, various types of heat-resistant resins, pitches, and the like.

Preferable examples of the heat-resistant resins include: polyimide, polyamide, polyamideimide, polyether, polyetherimide, polyetherketone, bismaleicimidetriazine, aramide, fuluoroethylene resin, polyphenylene, polyphenylene sulphide, and the like. These resins can be used alone or in combination.

It is preferable that an activated carbon used for the anode is formed in powders, fibers, and the like in order to increase the specific surface area of the electrode and increase the charging capacity of the non-aqueous electrolytic solution electric double layer capacitor.

Further, the activated carbon may be subjected to a heat treatment, a drawing treatment, a vacuum treatment at high temperature, and a rolling treatment for a purpose to increase the charging capacity of the non-aqueous electrolytic solution electric double layer capacitor.

--Other Component (a Conductive Agent and a Binder)--

The conductive agent is not particularly limited, but graphite and acetylene black and the like can be used.

Materials of the binder are not particularly limited, but resins such as polyvinylidene fluoride and tetrafluoroethylene can be used.

--Cathode--

As a cathode, polarizable electrodes similar to those for the anode can be preferably used.

--Non-Aqueous Electrolytic Solution--

The non-aqueous electrolytic solution contains an additive for the non-aqueous electrolytic solution electric double layer capacitor, a supporting salt, and, if necessary, other component.

--Supporting Salt--

A supporting salt can be selected from those that are conventionally known. However, use of a quaternary ammonium salt, which can provides excellent electric characteristics such as electric conductivity and the like in the non-aqueous electrolytic solution, is preferable.

The quaternary ammonium salt is required to be a quaternary ammonium salt that is able to form a multivalent ion, in that the quaternary ammonium salt is a solute which acts as an ion source for forming an electric double layer in the non-aqueous electrolytic solution, and is also able to effectively increase electric characteristics such as electric conductivity of the non-aqueous electrolytic solution.

Examples of the quaternary ammonium salts include: $(CH_3)_4N.BF_4$, $(CH_3)_3C_2H_5N.BF_4$, $(CH_3)_2(C_2H_5)_2N.BF_4$, $CH_3(C_2H_5)_3N.BF_4$, $(C_2H_5)_4N.BF_4$, $(C_3H_7)_4N.BF_4$, $CH_3(C_4H_9)_3N.BF_4$, $(C_4)_4N.BF_4$, $(C_6H_{13})_4N.BF_4$, $(C_2H_5)_4N.ClO_4$, $(C_2H_5)_4N.BF_4$, $(C_2H_5)_4N.PF_6$, $(C_2H_5)_4N.AsF_6$, $(C_2H_5)_4N.SbF_6$, $(C_2H_5)_4N.CF_3SO_3$, $(C_2H_5)_4N.C_4F_9SO_3$, $(C_2H_5)_4N.(CF_3SO_2)_2N$, $(C_2H_5)_4N.BCH_3(C_2H_5)_3$, $(C_2H_5)_4N.B(C_2H_5)_4$, $(C_2H_5)_4N.B(C_6H_5)_4$ and the like. Further, a hexafluorophosphate of the quaternary ammonium salt may be used. Moreover, solubility can be improved by increasing polarizability. Therefore, a quaternary ammonium salt can be used in which different alkyl groups are bonded to a nitrogen atom.

Examples of the quaternary ammonium salt include compounds represented by the following structural formulae (1) to (10):

Structural formula (1)

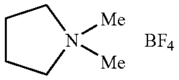

Structural formula (2)

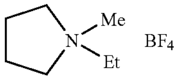

Structural formula (3)

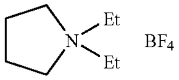

Structural formula (4)

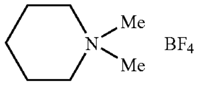

Structural formula (5)

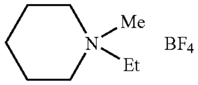

Structural formula (6)

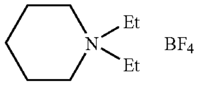

Structural formula (7)

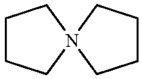

Structural formula (8)

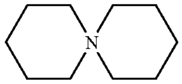

Structural formula (9)

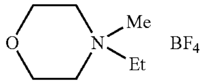

Structural formula (10)

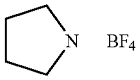

In the above-described structural formulae, Me represents a methyl group, and Et represents an ethyl group.

Among these quaternary ammonium salts, salts which are able to generate $(CH_3)_3N^+$ or $(C_2H_5)_4N^+$ as positive ions are preferable in that high electric conductivity can be secured. Further, salts which are able to generate negative ions whose formula weight is small are preferable.

These quaternary ammonium salts can be used alone or in combination.

The amount of the supporting salt in the non-aqueous electrolytic solution (solvent component) (1 kg) is preferably 0.2 to 1.5 mol, and more preferably 0.5 to 1.0 mol.

If the amount of the supporting salt in the non-aqueous electrolytic solution is less than 0.2 mol, electric characteristics such as sufficient electric conductivity of the non-aqueous electrolytic solution can be secured in some cases. On the other hand, if the amount of the supporting salt in the non-aqueous electrolytic solution exceeds 1.5 mol, viscosity of the non-aqueous electrolytic solution increases and electric characteristics such as electric conductivity may decrease.

--Additive for a Non-Aqueous Electrolytic Solution Electric Double Layer Capacitor--

The additive for a non-aqueous electrolytic solution electric double layer capacitor is the same as that in the paragraph of "the additive for a non-aqueous electrolytic solution electric double layer capacitor of the present invention", and contains the phosphazene derivative represented by formula (1).

--Viscosity--

The viscosity of the non-aqueous electrolytic solution at 25° C. is preferably 10 mPa.s (10 cP) or less, more preferably 5 mPa.s (5 cP) or less, and most preferably 4.0 mPa.s (4.0 cP) or less.

If the viscosity is 10 mPa.s (10 cP) or less, a non-aqueous electrolytic solution electric double layer capacitor can be provided with excellent electric characteristics such as low internal resistance, high conductivity and the like.

In the present invention, viscosity is measured for 120 minutes at each of rotational speeds of 1 rpm, 2 rpm, 3 rpm, 5 rpm, 7 rpm, 10 rpm, 20 rpm and 50 rpm by a viscometer (product name: R-type viscometer Model RE500-SL, manufactured by Toki Sangyo K.K.) and determined on the basis of the rotational speed as an analysis condition at which the value indicated by the viscometer reached 50 to 60%.

--Conductivity--

The viscosity of the non-aqueous electrolytic solution can be controlled to the aforementioned preferable range of values to make it easy for the non-aqueous electrolytic solution to have a preferable value of conductivity. The conductivity of the non-aqueous electrolytic solution (i.e., as the conductivity of quaternary ammonium salt solution: 1 mol/kg) is preferably is 2.0 mS/cm or more, and more preferably 5.0 mS/cm or more.

If the conductivity is 2.0 mS/cm or more, since sufficient conductivity of the non-aqueous electrolytic solution can be secured, it becomes possible to suppress internal resistance of the non-aqueous electrolytic solution double layer capacitor, and control ascent/descent of potentials during charging/discharging thereof.

The conductivity is a value obtained through a measuring method described below. Namely, the conductivity is measured under predetermined conditions (temperature: 25° C., pressure: normal pressure, and moisture percentage: 10 ppm or less) by using a conductivity meter (CDM210 type manufactured by Radio Meter Trading Co., Ltd.), while applying a constant current of 5 mA to the non-aqueous electrolytic solution secondary cell.

Theoretically, at first, a conductance (Gm) of a non-aqueous electrolytic solution is calculated. From this, an influence by a cable resistance (R) is removed to determine a conductance (G) of the electrolytic solution itself. Accordingly, a conductance $K=G \cdot K$ (S/cm) can be determined from the obtained value (G) and the cell constant (K) already known.

--Content--

Owing to the effects obtained by containing the phosphazene derivative in the non-aqueous electrolytic solution, a total amount in which the phosphazene derivative is contained in the non-aqueous electrolytic solution comprises three types of contents comprising: a first content capable of more preferably providing the non-aqueous electrolytic solution with "low-temperature characteristics"; a second content capable of more preferably "lowering the viscosity of the non-aqueous electrolytic solution"; and a third content capable of more preferably providing the non-aqueous electrolytic solution with "deterioration resistance".

From the viewpoint of the "low-temperature characteristics", the first content of the phosphazene derivative in the non-aqueous electrolytic solution is preferably 1 vol % or more, more preferably 3 vol % or more, and most preferably 5 vol % or more.

When the first content is less than 1 vol %, it becomes impossible to sufficiently lower the freezing point of a non-aqueous electrolytic solution, whereby low-temperature characteristics are insufficient.

Further, the "low-temperature characteristics" can be evaluated by measuring internal resistances (Ω) at 0° C., −5° C., and −10° C., respectively, and comparing the obtained values with the internal resistance (Ω) measured at 20° C.

From the viewpoint of the "lowering of the viscosity of the non-aqueous electrolytic solution", the second content of the phosphazene derivative in the non-aqueous electrolytic solution is preferably 3 to 80 vol % or more.

When the second content is less than 3 vol %, the viscosity of the non-aqueous electrolytic solution may not be lowered sufficiently. Besides, as for the descent of the freezing point, effects of the low-temperature characteristics improved by the addition of the phosphazene derivative to the non-aqueous electrolytic solution may not be developed. On the other hand, if the content exceeds 80 vol %, since the dipole moment is small, and solubility of the supporting salt deteriorates, excellent electric properties cannot be provided in some cases.

From the viewpoint of the "deterioration resistance", the third content of the phosphazene derivative in the non-aqueous electrolytic solution is preferably 2 vol % or more, and more preferably 3 to 75 vol %. Further, from a viewpoint that suffices both deterioration resistance and low-temperature characteristics at high level, the content of the phosphazene derivative is more preferably 5 to 75 vol %.

If the content is within the aforementioned range of values, deterioration can suitably be suppressed.

"Deterioration" refers to decomposition of a supporting salt, and effects due to prevention of the deterioration are evaluated by an evaluation method of stability described below.

--Other Component--

As other component, an aprotic organic solvent or the like is particularly preferable from the viewpoint of safety.

When the aprotic organic solvent is contained in the non-aqueous electrolytic solution, the lowering of viscosity of the non-aqueous electrolytic solution and improvement of electric conductivity are easily accomplished.

The aprotic organic solvents are not particularly limited, and the examples in the above description can be used. Among these, cyclic ester compounds such as ethylene carbonate, propylene carbonate, and γ-butyrolactone, chain ester compounds such as 1,2-dimethoxyethane, dimethyl carbonate, diethyl carbonate, and ethyl methyl carbonate are preferable. The cyclic ester compounds are preferable in that they have high relative dielectric constants and can dissolve easily the supporting salt, and the chain ester compounds are preferable in that they have low viscosity, and are able to lower the viscosity of the non-aqueous electrolytic solution. These can be used alone or in combination.

--Viscosity of an Aprotic Organic Solvent--

Viscosity of the aprotic organic solvent at 25° C. is preferably 10 mPa.s (10 cP) or less, and more preferably 5 mPa.s (5 cP) or less in order to easily lower the viscosity of the non-aqueous electrolytic solution.

--Other Member--

Examples of other material can include a separator, a collector and a container.

The separator is interposed between a cathode and an anode in order to prevent a short-circuit of the non-aqueous electrolytic solution electric double layer capacitor. The separator is not particularly limited, and known separator can preferably be used for the non-aqueous electrolytic solution electric double layer capacitors.

Microporous film, nonwoven fabric and paper can preferably be used as the materials for a separator, and specific examples thereof include: nonwoven fabrics, thin film layers and the like made from synthetic resins such as polytetrafluoroethylene, polypropylene, polyethylene and the like. Among these, polypropylene or polyethylene microporous film having a thickness of about 20 to 50 μm is particularly preferable.

The collector is not particularly limited, and a known collector which is ordinarily used for non-aqueous electrolytic solution electric double layer capacitors is preferably used. The collector is preferable which has excellent electrochemical corrosion resistance, chemical corrosion resistance, workabilty, and mechanical strength, and which can be manufactured inexpensively, and preferable examples thereof include aluminum, stainless steel, conductive resins, and the like.

The container is not particularly limited, and a conventionally known container for the non-aqueous electrolytic solution electric double layer capacitor is preferably used.

Materials such as aluminum, stainless steel, conductive resin and the like are preferably used for the container.

As the other member than the separator, collector and container, each of known members which are generally used for non-aqueous electrolytic solution electric double layer capacitor are preferably used.

--Internal Resistance of a Non-Aqueous Electrolytic Solution Electric Double Layer Capacitor--

The internal resistance (Ω) of a non-aqueous electrolytic solution electric double layer capacitor is preferably 0.1 to 0.3 (Ω), and more preferably 0.1 to 0.25 (Ω).

The internal resistance can be obtained by a known method such as the method described below in which internal resistance is measured. Namely, when the non-aqueous electrolytic solution electric double layer capacitor is made and charging/discharging curves are measured, the internal resistance can be obtained by a deflection width of potentials in accordance with charging rest or discharging rest.

--Configuration and Use of a Non-Aqueous Electrolytic Solution Electric Double Layer Capacitor--

Configurations of the non-aqueous electrolytic solution electric double layer capacitors are not particularly limited, and conventionally known configurations such as cylinder-type (cylindrical or square) or flat-type (coin) are preferably used.

The non-aqueous electrolytic solution electric double layer capacitors are preferably used for power supplies for memory back-up of various electronic devices, industrial apparatuses, and aeronautical apparatuses; electric magnetic holders for toys, cordless apparatuses, gas apparatuses, and instant boilers; and clocks such as wrist watch, a wall clock, a solar clock, and an AGS (automatic gain stabilization) wrist watch.

--Performance of a Non-Aqueous Electrolytic Solution Electric Double Layer Capacitor--

The non-aqueous electrolytic solution electric double layer capacitor of the present invention is excellent in deterioration resistance, and has high conductivity because interface resistance of the non-aqueous electrolytic solution is low and internal resistance is thereby low, and is also excellent in low temperature characteristics.

EXAMPLES

With reference to Examples and Comparative Examples, a more detailed description of the present invention will be given hereinafter. The present invention is not limited to Examples described below:

Example 1

[Preparation of a Non-Aqueous Electrolytic Solution]

2 ml (2 vol %) of a phosphazene derivative (a cyclic phosphazene derivative represented by formula (1) in which n is 3)(i.e., an additive for a non-aqueous electrolytic solution secondary cell) was added to 98 ml of a mixed solvent of diethyl carbonate and ethylene carbonate (mixture ratio (i.e., volume ratio): diethyl carbonate/ethylene carbonate=1/1) (aprotic organic solvent). Further, $LiPF_6$ (supporting salt) was dissolved in this mixture at concentration of 0.75 mol/kg, whereby a non-aqueous electrolytic solution (viscosity at 25° C.: 3.6 mPa.s (3.6 cP), conductivity of 0.75 mol/l of a lithium salt dissolved solution: 7.5 mS/cm) was prepared.

The viscosity and conductivity of the non-aqueous electrolytic solution were respectively measured by the measuring method described above.

<Evaluation of Deterioration>

Deterioration was evaluated with respect to the obtained non-aqueous electrolytic solution in the same manner as the evaluation method of stability such that moisture percentage (ppm), concentration of hydrogen fluoride (ppm), and charging/discharging capacity (mAh/g) of the non-aqueous electrolytic solution were measured and calculated, immediately after the non-aqueous electrolytic solution was prepared, and after the non-aqueous electrolytic solution was left in a gloved box for two months. At this time, the charging/discharging capacity (mAh/g) was determined such that a charging/discharging curve was measured by using an anode whose weight has already been known, or the aforementioned cathode, and the obtained charging amounts and discharging amounts were divided by the weight of electrodes used. Further, change of hues of the non-aqueous electrolytic solution obtained immediately after the non-aqueous electrolytic solution was prepared and after the non-aqueous electrolytic solution was left in the gloved box for two months was visually observed. The results are shown in table 1.

[Preparation of a Non-Aqueous Electrolytic Solution Secondary Cell]

A cobalt oxide represented by chemical formula $LiCoO_2$ was used as an anode active substance. 10 parts of acetylene black (conductive assistant) and 10 parts of teflon binder (binder resin) were added to 100 parts of $LiCoO_2$. This was kneaded with an organic solvent (a mixture of ethyl acetate and ethanol in a ratio of 50 to 50 wt %). Thereafter, this was press-rolled to form a thin anode sheet (thickness: 100 μm and width: 40 mm).

Thereafter, an aluminum foil (collector), to the surface of which a conductive adhesive was applied and which had a thickness of 25 μm, was sandwiched by the two anode sheets thus obtained. A separator (a microporous polypropylene film) having a thickness of 25 μm was put thereon, and a lithium metal foil having a thickness of 150 μm was superimposed thereon, and then rolled up to thereby make a cylindrical electrode. The cylindrical electrode had an anode length of about 260 mm.

The cylindrical electrode was impregnated with the non-aqueous electrolytic solution, and sealed to thereby form a size AA lithium cell.

<Measurement and Evaluation of Cell Properties>

After initial properties (such as voltage and internal resistance) of the cell obtained were measured and evaluated at 20° C., charging/discharging cycle performance was measured and evaluated by a method of evaluation described below. The results are shown in table 1.

<<Evaluation of Charging/Discharging Cycle Performance>>

Charging/discharging were repeated to 50 cycles, providing that a maximum voltage was 4.5V, a minimum voltage was 3.0V, a discharging current was 100 mA, and a charging current was 50 mA. A charging/discharging capacity at this time was compared with that at the initial stage of charging/discharging, and a capacity remaining ratio after charging/discharging was repeated 50 times was calculated. Similarly, the capacity remaining ratio for total three cells was measured and calculated to determine a mean value to thereby evaluate charging/discharging characteristics.

<Evaluation of Characteristics at Low Temperature (Measurement of Capacity at Low Temperature)>

Charging/discharging of the obtained cells was repeated to 50 cycles under the same conditions as the aforementioned "Evaluation of charging/discharging characteristics" except that discharging was conducted at low temperature (such as 0° C., −10° C., and −20° C.). A discharging capacity at such low temperature at this time was compared with that measured at 20° C. to thereby calculate a discharging capacity remaining ratio by using the equation below. The discharging capacity remaining ratio was measured and calculated with respect to total three cells, whereby a mean value was determined to evaluate discharging characteristics at low temperature. The results arc shown in table 1.

Discharging capacity remaining ratio=discharging capacity at low temperature/discharging capacity (20° C.)×100 (%)  Equation (2)

Example 2

Except that the amount of the mixed solvent of diethyl carbonate and ethylene carbonate was changed to 99 ml, and that of the phosphazene derivative was changed to 1 ml (1 vol %) in the "Preparation of a non-aqueous electrolytic solution" in Example 1, a non-aqueous electrolytic solution (viscosity at 25° C.: 3.6 mPa.s (3.6 cP), and conductivity of 0.75 mol/l of a lithium salt dissolved solution: 7.6 mS/cm) was prepared in the same manner as that in Example 1, whereby deterioration resistance was evaluated. Further, a non-aqueous electrolytic solution secondary cell including the non-aqueous electrolytic solution was made in the same manner as in Example 1, and initial cell properties (such as voltages and internal resistances), charging/discharging cycle performance, and low-temperature characteristics thereof were respectively measured and evaluated. The results are shown in table 1.

Comparative Example 1

Except that the phosphazene derivative was replaced by a phosphazene derivative (i.e., a cyclic phosphazene derivative obtained by replacing six Fs of a compound represented by formula (1) in which n is 3, with six methoxyethoxyethoxy groups) in the "Preparation of the non-aqueous electrolytic solution" in Example 1, a non-aqueous electrolytic solution (viscosity at 25° C.: 8.0 mPa.s (8.0 cP), and conductivity of 0.75 mol/l of a lithium salt solution: 6.0 mS/cm) was prepared in the same manner as that in Example 1, whereby deterioration resistance was evaluated. Further, a non-aqueous electrolytic solution secondary cell containing this non-aqueous electrolytic solution was made in the same manner as in Example 1, and initial cell properties (such as voltages and internal resistances), charging/discharging cycle performance, and low-temperature characteristics thereof were respectively measured and evaluated. The results are shown in table 1.

<Evaluation of Deterioration>

Deterioration was evaluated, in the same manner as the evaluation method of stability, such that moisture percentage (ppm), concentration of hydrogen fluoride (ppm), and internal resistance (Ω) of the non-aqueous electrolytic solution were measured and calculated at 20° C. immediately after the non-aqueous electrolytic solution was prepared and after the non-aqueous electrolytic solution was left in a gloved box for two months. At this time, the internal resistance (Ω) was determined such that a charging/discharging curve was measured by using an anode whose weight has already been known, or the aforementioned cathode, and the obtained charging amounts and discharging amounts were divided by the weight of electrodes. Further, change of hues of the non-aqueous electrolytic solution obtained immediately after the non-aqueous electrolytic solution was prepared and after the non-aqueous electrolytic solution was left in the gloved box for two months was visually observed. The results are shown in table 2.

TABLE 1

| | After preparation of electrolytic solution (Evaluation of deterioration) | | | After left for 2 months (in gloved box) (Evaluation of deterioration) | | | | | Cell properties (charging/discharging capacity (mAh/g)) | |
|---|---|---|---|---|---|---|---|---|---|---|
| Examples | Charging/discharging capacity (mAh/g) | HF contents (ppm) | Moisture percentage (ppm) | Charging/discharging capacity (mAh/g) | HF contents (ppm) | Moisture percentage (ppm) | Change of hues | Evaluation of deterioration | After initial charging/discharging | After 50 cycles of charging/discharging |
| Ex. 1 | 147 | 2 | 2 | 147 | 3 | 2 | none | Extremely stable | 147 | 145 |
| Ex. 2 | 146 | 2 | 2 | 146 | 2 | 2 | light yellow | stable | 146 | 145 |
| Com. Ex. 1 | 143 | 1 | 2 | 142 | 1 | 2 | none | stable | 144 | 140 |

| | Evaluation of low-temperature characteristics (discharging capacity remaining ratio (%) after 50 cycles) | | | | | | | |
|---|---|---|---|---|---|---|---|---|
| Examples | 0° C. during discharging | −10° C. during discharging | −20° C. during discharging | Cell properties (initial internal resistance (Ω)) | Cell properties (initial voltage) | Viscosity of non-aqueous electrolytic solution (before adding supporting salt) at 25° C. (mPa · s(cP)) | Viscosity of non-aqueous electrolytic solution at 25° C. (mPa · s(cP)) | Conductivity of non-aqueous electrolytic solution (mS/cm) |
| Ex. 1 | 95 | 70 | 50 | 0.09 | 2.65 | 1.8 | 3.6 | 7.5 |
| Ex. 2 | 95 | 60 | 50 | 0.09 | 2.65 | 1.8 | 3.6 | 7.6 |
| Com. Ex. 1 | 70 | 50 | 30 | 0.18 | 2.8 | 3.2 | 8.0 | 6.0 |

Example 3

[Preparation of a Non-Aqueous Electrolytic Solution]

2 ml (2 vol %) of a phosphazene derivative (a cyclic phosphazene derivative represented by formula (1) in which n is 3)(i.e., an additive for a non-aqueous electrolytic solution electric double layer capacitor) was added to 98 ml of propylene carbonate (aprotic organic solvent). Further, tetraethyl ammonium fluoroborate $(C_2H_5)_4N.BF_4$ (supporting salt) was dissolved in this mixture at the concentration of 1 mol/kg, whereby a non-aqueous electrolytic solution (viscosity at 25° C.: 3.8 mPa.s (3.8 cP) was prepared.

[Preparation of Anodes/Cathodes (Polarizable Electrodes)]

Activated carbon (Kuractive-1500 manufactured by Kuraray Chemical Co., Ltd), acetylene black (conductive agent) and tetrafluoroethylene (PTFE) (binder) were mixed with each other so that a massive ratio (activated carbon/acetylene black/PTFE) was 8/1/1, whereby a mixture was obtained.

100 mg of the obtained mixture was sampled, and contained in a pressure tight carbon container (20 mmϕ), and pressed powder was formed from the mixture at a pressure of 150 $kgf/cm^2$ and at room temperature, whereby anodes and cathodes (polarizable electrodes) were made.

[Preparation of a Non-Aqueous Electrolytic Solution Double Layer Capacitor]

The obtained anodes and cathodes, and aluminum metal plate (collector) (thickness: 0.5 mm), and polypropylene/polyethylene plate (separator) (thickness: 25 μm) were used to assemble a cell. The cell was sufficiently vacuum-dried.

The cell was impregnated with the non-aqueous electrolytic solution, whereby a non-aqueous electrolytic solution electric double layer capacitor was prepared.

[Measurement of Electric Conductivity of a Non-Aqueous Electrolytic Solution Electric Double Layer Capacitor]

While a constant current (5 mA) was flown into the obtained capacitor, electric conductivity of the capacitor was measured by a conductivity meter (CDM210 manufactured by Radio Meter Trading Co., Ltd.) The results are shown in table 2.

Further, if the electric conductivity of the non-aqueous electrolytic solution electric double layer capacitor at 25° C. is 5.0 mS/cm or more, it is a level that does not cause a practical problem.

[Evaluation of Low-Temperature Characteristics]

Further, with respect to the obtained non-aqueous electrolytic solution electric double layer capacitor, internal resistance (ϕ) thereof was measured at 0° C., −5° C., and −10° C., respectively, and compared with the internal resistance (ϕ) that was measured at 20° C., and evaluated. Respective internal resistances (Ω) at 0° C., −5° C., and −10° C. are shown in table 2.

Example 4

Except that the amount of propylene carbonate was changed to 99 ml, and that of the phosphazene derivative was changed to 1 ml (1 vol %) in the "Preparation of a non-aqueous electrolytic solution" in Example 3, a non-aqueous electrolytic solution (viscosity at 25° C.: 3.9 mPa.s (3.9 cP) was prepared in the same manner as that in Example 3, whereby deterioration was evaluated. Further, a non-aqueous electrolytic solution electric double layer capacitor containing this non-aqueous electrolytic solution was made in the same manner as that in Example 3, and electric conductivity and low-temperature characteristics thereof were respectively measured and evaluated. The results are shown in table 2.

Comparative Example 2

Except that the phosphazene derivative was replaced by a phosphazene derivative (i.e., a cyclic phosphazene derivative obtained by replacing six Fs of a compound represented by formula (1) in which n is 3 with six methoxyethoxyethoxy groups) in the "Preparation of the non-aqueous electrolytic solution" in Example 3, a non-aqueous electrolytic solution (viscosity at 25° C.: 8.0 mPa.s (8.0 cP)) was prepared in the same manner as that in Example 3, whereby deterioration was evaluated. Further, a non-aqueous electrolytic solution electric double layer capacitor containing this non-aqueous electrolytic solution was made in the same manner as in Example 3, and electric conductivity and low-temperature characteristics thereof were respectively measured and evaluated. The results are shown in table 2.

TABLE 2

| | After preparation of electrolytic solution (Evaluation of deterioration) | | | After left for 2 months (in gloved box) (Evaluation of deterioration) | | | | |
|---|---|---|---|---|---|---|---|---|
| Examples | Internal resistance (Ω) | HF contents (ppm) | Moisture percentage (ppm) | Internal resistance (Ω) | HF contents (ppm) | Moisture percentage (ppm) | Change of hues | Evaluation of deterioration |
| Example 3 | 0.10 | less than 1 ppm | 2 | 0.10 | less than 1 ppm | 2 | none | extremely stable |
| Example 4 | 0.10 | less than 1 ppm | 2 | 0.10 | less than 1 ppm | 2 | light yellow | Stable |
| Com. Example 2 | 0.10 | less than 1 ppm | 1 | 0.10 | less than 1 ppm | 2 | none | stable |

| | Evaluation of low-temperature characteristics (Ω) | | | | | |
|---|---|---|---|---|---|---|
| Examples | Internal resistance (Ω) (0° C.) | Internal resistance (Ω) (−5° C.) | Internal resistance (Ω) (−10° C.) | Viscosity of non-aqueous electrolytic solution (before adding supporting salt) (25° C.) (mPa · s) | Viscosity of non-aqueous electrolytic solution (25° C.) (mPa · s) | Conductivity of non-aqueous electrolytic solution (25° C.) (mS/cm) |
| Example 3 | 0.15 | 0.22 | 0.25 | 2.4 | 3.8 | 7.6 |
| Example 4 | 0.16 | 0.23 | 0.28 | 2.5 | 3.9 | 7.4 |
| Com. Example 2 | 0.22 | 0.30 | 0.45 | 2.5 | 8.0 | 7.0 |

What is claimed is:

1. A non-aqueous electrolytic solution electric double layer capacitor, comprising:

a non aqueous electrolytic solution including an additive for the non-aqueous electrolytic solution electric double layer capacitor that contains a phosphazene derivative represented by formula (1), and a supporting salt:

an anode; and a cathode, wherein the content of the phosphazene derivative in the non-aqueous electrolytic solution is 3 to 80 vol %.

$$(PNF_2)_n \qquad \text{formula (1)}$$

in which n represents 3 to 14.

2. The capacitor of claim 1, wherein viscosity of the non-aqueous electrolytic solution at 25° C. is no more than 4.0 mPa·s (4.0 cP).

3. The capacitor of claim 1, wherein the non-aqueous electrolytic solution contains therein an aprotic organic solvent.

4. The capacitor of claim 3, wherein the aprotic organic solvent includes at least one of cyclic and chain ester compounds.

5. A non-aqueous electrolytic solution electric double layer capacitor, comprising:

a non aqueous electrolytic solution including an additive for the non-aqueous electrolytic solution electric double layer capacitor that contains therein a phosphazene derivative represented by formula (1), and a supporting salt:

an anode; and a cathode, wherein the content of the phosphazene derivative in the non-aqueous electrolytic solution is 3 to 75 vol %.

$$(PNF_2)_n \qquad \text{formula (1)}$$

in which n represents 3 to 14.

* * * * *